(No Model.)

G. A. LAMBERT.
PLOW COLTER.

No. 483,457. Patented Sept. 27, 1892.

WITNESSES
C. S. Frye,
Thomas E. Turpin

INVENTOR:
George A. Lambert
By W. T. Fitzgerald
Attorneys

UNITED STATES PATENT OFFICE.

GEORGE A. LAMBERT, OF ORRINGTON, MAINE, ASSIGNOR OF ONE-HALF TO ARTHUR A. YOUNG, OF SAME PLACE.

PLOW-COLTER.

SPECIFICATION forming part of Letters Patent No. 483,457, dated September 27, 1892.

Application filed October 30, 1891. Serial No. 410,317. (No model.)

*To all whom it may concern:*

Be it known that I, GEORGE A. LAMBERT, a citizen of the United States, residing at Orrington, in the county of Penobscot and State of Maine, have invented certain new and useful Improvements in Plow-Colters; and I do hereby declare the following to be a full, clear, and exact description of the invention, such as will enable others skilled in the art to which it appertains to make and use the same.

The object of my invention is to produce an improved plow-colter, which is designed and adapted to aid the progress of a plow through a furrow and prevent the accumulation in front of the plow of rubbish, vines, roots, or the like that tend materially to increase the labor of directing the plow and the draft or weight of the load upon the team which draws it.

Figure 1:
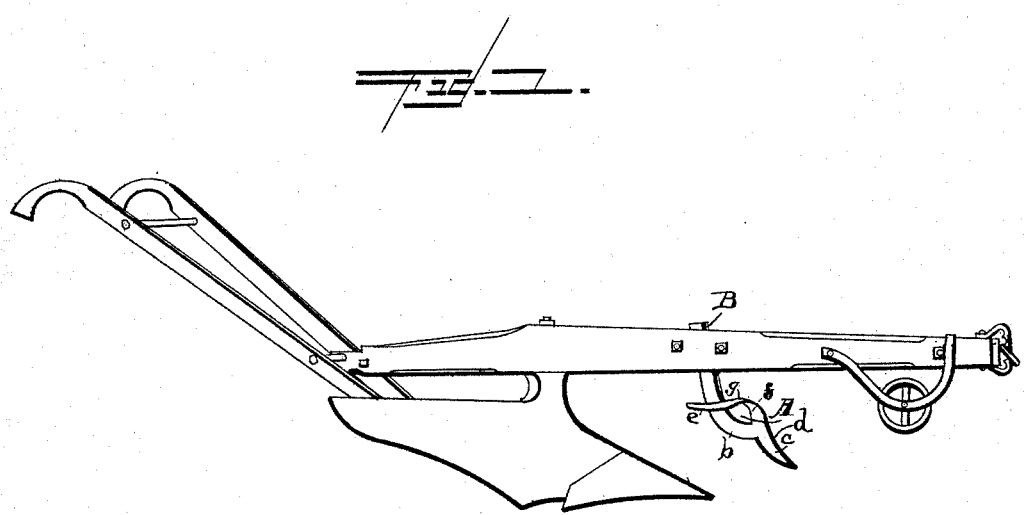
Figure 2:

In the accompanying drawings, Figure 1 is a perspective view of a plow with my colter attached as in use. Fig. 2 is a perspective view of the colter detached.

Referring to the letters on the drawings, B indicates the shank of the colter, which is preferably straight and somewhat flattened in its vertical part, as indicated by the letter $a$, and is bent almost at right angles at its lower end $b$.

A indicates the cutter-blade of the colter, that is composed of the parts $c, f,$ and $g$ and is united to the shank and is preferably cast or forged with it. The cutter-blade terminates in a point, and its portion $c$ is downwardly and forwardly inclined, so as to present its cutting-edge $d$ underneath opposing obstacles, thus severing them by a shearing action of the blade or forcing them upwardly out of the ground and not against the resistance of the ground. The part $f$ of the blade is laterally, rearwardly, and preferably somewhat downwardly bent. The cutting-edge $d$ of the part $c$ of the blade is dished or concave and merges gradually into the cutting-edge $e$ of the part $f$, which is slightly convex. The two curves unite to form a regular smooth compound curve. At the part $g$ the blade A is twisted so as to form a spiral, and extending toward the rear of the shank exposes near its end a flat broad side, into which the cutting-edge $e$ in effect disappears.

The operation of my device is as follows: The colter being in position upon a plow, as illustrated, for example, in Fig. 1 of the drawings, its point as the plow is driven into the soil cuts the ground in advance of the plow, and sinking beneath the surface cuts the obstructions that oppose themselves with sufficient resistance. The loose rubbish it carries along the compound curve of its blade, cutting its way as occasion may require, and finally deflecting and depositing from the twisted arm $g$ to one side of the plow any portion of trash that may remain uncut. In this manner a clean straight furrow may be made. The clogging of the plow is prevented and the load upon the team which draws the plow is materially diminished.

What I claim is—

A plow-colter consisting of a shank portion attached to the rear of the cutting-blade, said blade having a downwardly and forwardly projecting cutting-point and being deflected laterally and rearwardly above its connection with the shank, its extreme rear portion being twisted to form a spiral and extending toward the rear of the shank in a substantially-horizontal direction and having a sharp front edge, substantially as and for the purpose specified.

GEORGE A. LAMBERT.

In presence of—
ARTHUR A. YOUNG,
G. M. MCALISTER.